(12) United States Patent
Thompson

(10) Patent No.: US 7,686,726 B2
(45) Date of Patent: Mar. 30, 2010

(54) ELECTRIC DRIVE TRANSMISSION

(75) Inventor: Robert William Thompson, Farnborough (GB)

(73) Assignee: Qinetiq Limited (GB)

( * ) Notice: Subject to any disclaimer, the term of this patent is extended or adjusted under 35 U.S.C. 154(b) by 514 days.

(21) Appl. No.: 11/658,244

(22) PCT Filed: Aug. 10, 2005

(86) PCT No.: PCT/GB2005/003124

§ 371 (c)(1),
(2), (4) Date: Jan. 22, 2007

(87) PCT Pub. No.: WO2006/021745

PCT Pub. Date: Mar. 2, 2006

(65) Prior Publication Data

US 2008/0300084 A1    Dec. 4, 2008

(30) Foreign Application Priority Data

Aug. 26, 2004   (GB) ................... 0418967.6

(51) Int. Cl.
  *F16H 48/30*   (2006.01)
(52) U.S. Cl. .................. 475/150; 475/18; 475/151
(58) Field of Classification Search .............. 475/18, 475/19, 21, 28, 29, 150, 151, 154, 329, 330, 475/149; 180/6.2, 6.28, 6.44, 6.48, 6.5, 6.7, 180/9.44
See application file for complete search history.

(56) References Cited

U.S. PATENT DOCUMENTS 4,813,506 A * 3/1989 Smith .................. 180/6.44
4,998,591 A    3/1991 Zaunberger
5,396,968 A * 3/1995 Hasebe et al. .............. 180/65.6
5,620,387 A    4/1997 Janiszewski et al.
RE36,678 E * 5/2000 Moroto et al. ........... 180/65.23
7,441,623 B2 * 10/2008 Casey et al. .................. 180/243
2003/0203782 A1 10/2003 Casey et al.
2004/0069542 A1 * 4/2004 Simmons et al. ............. 180/6.2

FOREIGN PATENT DOCUMENTS

| | | |
|---|---|---|
| DE | 19841159 | 1/2000 |
| EP | 0 769 839 | 4/1997 |
| GB | 2161770 | 1/1986 |
| GB | 2339082 | 1/2000 |
| GB | 2341731 | 3/2000 |
| WO | WO 02/083483 | 10/2002 |
| WO | WO 2005/054712 | 6/2005 |

* cited by examiner

*Primary Examiner*—David D Le
(74) *Attorney, Agent, or Firm*—McDonnell Boehnen Hulbert & Berghoff LLP

(57) ABSTRACT

An electric drive transmission for a skid steered vehicle has a central casing housing a pair of propulsion motors comprising respective stators and rotors, each rotor being coupled to drive a respective through shaft via a respective epicyclic gear change mechanism. The through shafts are coupled at their inboard ends to a controlled differential with an input from a steer motor, and are coupled at their outboard ends to respective epicyclic gear reduction mechanisms. The through shafts are supported in the casing by respective bearings and the propulsion motor rotors are supported on the through shafts by respective bearings. By supporting the rotors on the through shafts rather than in separate bearings to the casing the diameter and speed rating of the requisite rotor bearings can be reduced.

11 Claims, 3 Drawing Sheets

ELECTRIC DRIVE TRANSMISSION

BACKGROUND OF THE INVENTION

(1) Field of the Invention

The present invention relates to electric drive transmissions and more particularly to bearing arrangements therefor. It will be described hereinafter in terms of its application within an overall drive configuration for a battle tank, bulldozer or other skid steered vehicle of the kind described in WO-02/083483. This is not, however, to be construed as limiting the scope of the invention as defined below, which may be found more generally useful where an electric motor is required to deliver torque via a gear change mechanism to a shaft which may be coupled to a load or loads at either axial end of the motor.

(2) Description of the Art

U.S. Pat. No. 4,998,591 discloses in FIG. 3 an electric drive transmission for a tracked vehicle where an electric propulsion motor is arranged coaxially around a main transverse shaft which is coupled at its opposite ends via differential gears to the driven tracks. The motor has a hollow shaft arranged coaxially around the main shaft. A reduction gear or shift gear is also arranged coaxially around the main shaft and connects the motor shaft to the main shaft via a hollow connecting shaft. The bearing arrangement for the various shafts is not disclosed. It would be conventional, however, for the motor shaft to be supported by bearings in the motor casing and for the main shaft to be supported by bearings in some other fixed part of the vehicle structure.

For high power density, electric propulsion motors are often designed to run at high rotational speeds (e.g. in the region of 12,000 RPM). Operating the arrangement of U.S. Pat. No. 4,998,591 with such a high speed motor would be problematical, however. By running the main shaft through the motor shaft the diameter of the latter must necessarily be greater than that of the main shaft, and it must necessarily be of equivalent torque capability. If borne within the motor casing it also follows that the motor shaft bearings must be of substantially larger diameter than the main shaft bearings. Achieving high rotational speeds with large diameter bearings is difficult, however, due to the high rolling speed of the bearing elements, the heat so generated, and other dynamic effects. In practical terms this is therefore likely to impose an undesirable constraint on the operational speed and hence power density of the propulsion motor in the indicated prior art arrangement.

It is one aim of the present invention to overcome the above-noted drawback of the prior art and accordingly in one aspect the invention resides in an electric drive transmission comprising:

a casing;
an electric motor comprising a stator fixed in the casing and an associated rotor borne within the casing;
a separate through shaft passing coaxially through the rotor for delivering torque from the motor to one or more loads; and
a gear change mechanism located within the casing and adapted to transmit torque from the rotor to the through shaft at selected gear ratios;
the through shaft being rotationally supported by bearings acting between said shaft and the casing; and
the rotor being rotationally supported by bearings acting between the rotor and the through shaft.

It is to be understood that the aforesaid bearings may act directly between the stated components or indirectly through other components of the transmission.

By supporting the motor rotor on the through shaft rather than in separate bearings to the casing the diameter of the requisite rotor bearings can be reduced. In addition, depending on the gear ratio selected through the gear change mechanism, the speed differential (if any) between the rotor and through shaft will be substantially less than that between the rotor and casing, meaning that the speed rating of the rotor bearings can be reduced accordingly. In these ways the problems of high speed large diameter bearings may be avoided. Furthermore by reducing the number of bearing points in the casing the complexity, mass and cost of the casing and the overall size of the transmission can all be reduced.

In another aspect the invention resides in a drive configuration for a skid steered vehicle comprising:

a respective drive member at each side of the vehicle;
a pair of electric drive transmissions according to the first aspect of the invention;
a controlled differential device located between said transmissions; and
a steer motor coupled to the controlled differential device;
the through shaft of each said transmission being coupled at one end to turn a respective said drive member; and
said through shafts being coupled at their opposite ends to respective sides of the controlled differential device.

It is to be understood that the coupling of the through shafts at either end may be direct to the stated components or indirect through other components of the configuration.

The two said transmissions may share a common casing which also houses components of the controlled differential device.

DESCRIPTION OF THE FIGURES

These and other features of the invention will now be more particularly described, by way of example, with reference to the accompanying drawings, in which:—

DESCRIPTION OF A PREFERRED EMBODIMENT

Figure 1:
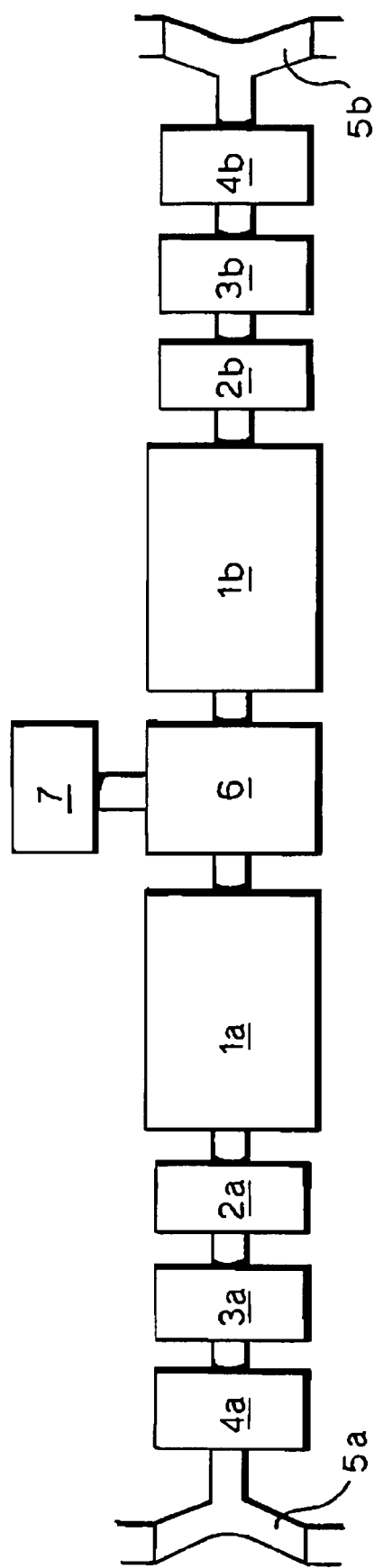
FIG. 1 is a diagrammatic illustration of a drive configuration for a skid steered vehicle to which the invention may be applied.

FIG. 1 illustrates diagrammatically one form of vehicular drive configuration with which transmissions in accordance with the present invention may be found particularly useful, being a track drive arrangement for a skid steered vehicle according to WO-02/083483. In this Figure a transverse drive arrangement comprises two electric propulsion motors 1a and 1b and associated transmission trains. Outboard of the motors the transmission includes in each case a gear change/gear reduction unit 2a, 2b, brake 3a, 3b and final drive gear reduction 4a, 4b all encased within the vehicle hull, leading to respective track drive sprockets 5a and 5b at opposite sides of the vehicle. Inboard the motors are coupled to a controlled differential 6 driven by an electric steer motor 7.

Figure 2:
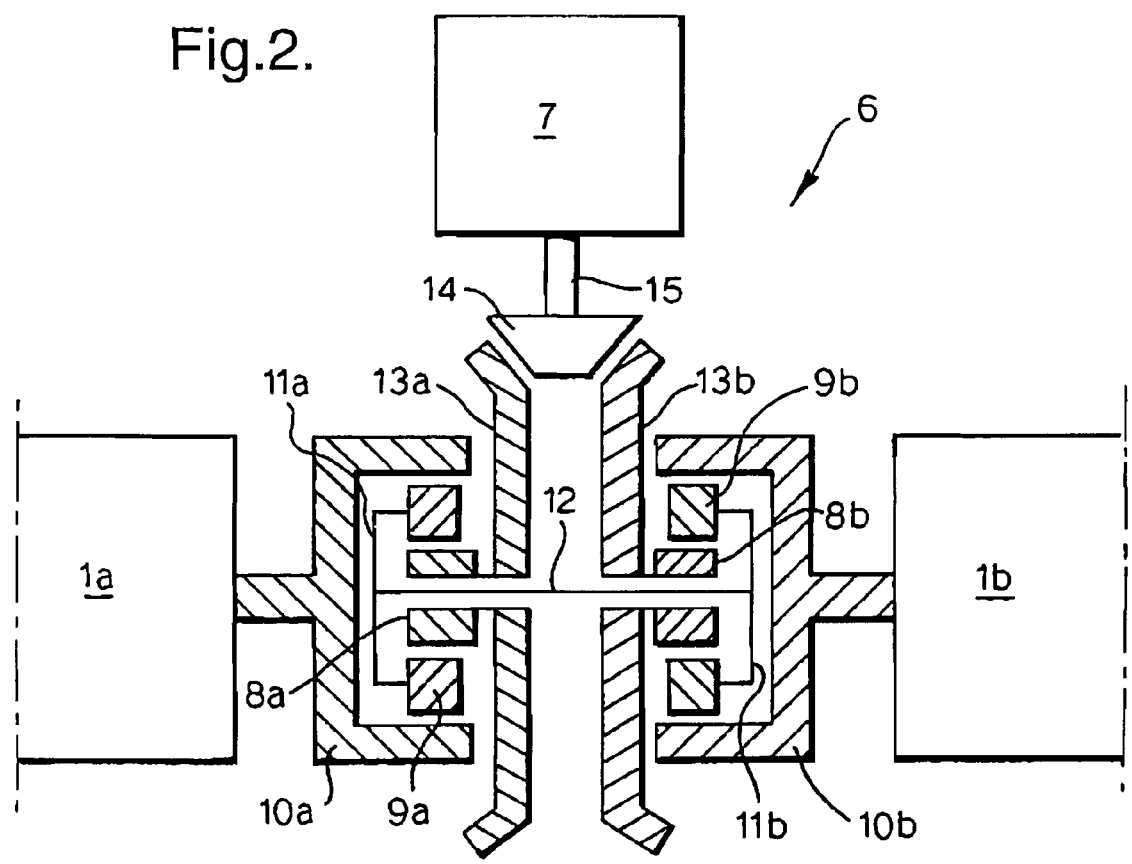
FIG. 2 illustrates schematically a mechanism for the controlled differential of the configuration of FIG. 1.

The mechanism of the controlled differential 6 is illustrated schematically in FIG. 2. It comprises an opposed pair of planetary gear sets each comprising a sun gear 8a, 8b, planet gears 9a, 9b and an annulus or ring gear 10a, 10b, with the planet carriers 11a, 11b of each set interconnected through a cross shaft 12 passing through the sun gears. The annuli 10a, 10*b* are coupled to the respective adjacent propulsion motors 1*a*, 1*b* and the sun gears 8*a*, 8*b* are fast with respective crown wheels 13*a*, 13*b* which mesh with a pinion 14 on the end of the steer motor shaft 15.

During straight line running the steer motor 7 is energised to hold the pinion 14 stationary, so the crown wheels 13*a*, 13*b* and sun gears 8*a*, 8*b* are likewise held stationary. Energising the propulsion motors 1*a*, 1*b* to drive the sprockets 5*a*, 5*b* in this condition also rotates the annuli 10*a*, 10*b* to cause the planet gears 9*a*, 9*b* to revolve about the sun gears 8*a*, 8*b*. Due to their connection through the shaft 12 the two planet carriers 11*a*, 11*b* must rotate at the same speed, also equalising the speeds of the two annuli 10*a*, 10*b* and the two connected transmission trains in this condition. The power distribution between the two transmissions will be determined by the torque required to drive the respective sprockets 5*a*, 5*b* with torque being transferred through the controlled differential from one side to the other as required e.g. in response to changing ground conditions.

To turn the vehicle in one sense while being propelled by the motors 1*a*, 1*b* the steer motor 7 is energised to rotate the pinion 14 in a corresponding sense, thus causing the crown wheels 13*a*, 13*b* and their respective sun gears 8*a*, 8*b* to rotate in mutually opposite senses. The effect, since the two planet carriers 11*a*, 11*b* must always turn together, is to increase the rate of rotation of the individual planet gears 9*a* or 9*b* in that set for which the sun gear 8*a* or 8*b* is turning in the opposite sense to the respective annulus 10*a* or 10*b*, and to decrease the rate of rotation of the individual planet gears 9*a* or 9*b* in that set for which the sun gear 8*a* or 8*b* is turning in the same sense as the respective annulus 10*a* or 10*b*. This in turn causes the annuli 10*a*, 10*b* and respective connected transmissions to the sprockets 5*a*, 5*b* to run at different speeds thus turning the vehicle in the required sense, while power from the slower running transmission is regenerated to the faster running transmission through the controlled differential. To turn the vehicle in the opposite sense the steer motor is energised to rotate the pinion in the opposite sense and so forth, and it will be appreciated that for a given forward speed of the vehicle the turning radius in either sense will depend on the speed at which the steer motor is operated—the faster the steer motor the tighter the turn.

In a functionally equivalent variant, the steer motor 7 may be oriented on a parallel axis to the two planetary gear sets of the controlled differential and arranged to drive the sun gears 8*a*, 8*b* in opposite senses through respective sour gear trains, as indicated in FIG. 2 of WO-02/083483. In a further variant, there may be two steer motors on a common axis parallel to the planetary gear sets and arranged to drive the sun gears 8*a*, 8*b* in opposite senses through integrated spur gear trains as shown in our copending United Kingdom patent application no. 0502647.1.

Although for ease of illustration in FIG. 1 the gear change/ gear reduction units 2*a*, 2*b* are shown separately from the propulsion motors 1*a*, 1*b*, in practice it is preferred that at least the gear change mechanisms are integrated with the motors in a way which permits steering while making a gear change. This is shown in FIG. 3 which is a simplified cross-section through a central casing of the drive configuration which houses the controlled differential 6, two propulsion motors 1*a*, 1*b* and associated gear change and gear reduction mechanisms.

Figure 3:
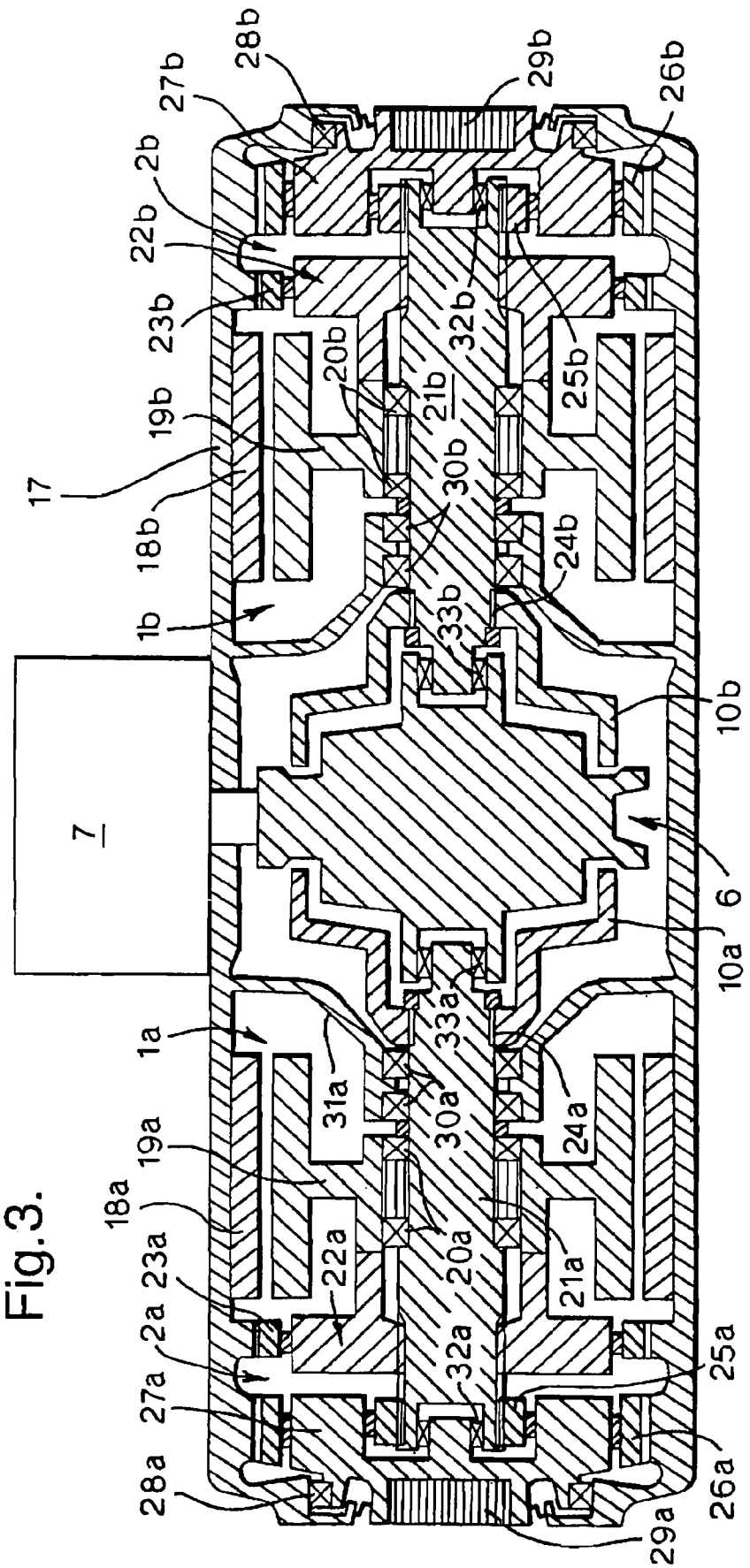
FIG. 3 is a simplified cross-section through the central casing and associated transmission components in a practical embodiment of the configuration of FIG. 1.

Referring to FIG. 3 there is shown a casing 17 of e.g. cast or machined aluminium alloy having a generally cylindrical envelope. The stators 18*a*, 18*b* of the propulsion motors 1*a*, 1*b* are mounted in respective fixed positions within this casing and the associated rotors 19*a*, 19*b* are supported by bearings 20*a*, 20*b* on respective coaxial through shafts 21*a*, 21*b*. Respective gear change mechanisms 22*a*, 22*b* located within the casing 17 are arranged to transmit torque from the motor rotors 19*a*, 19*b* to the respective through shafts 21*a*, 21*b* at selected gear ratios. In this respect each gear change mechanism 22*a*, 22*b* may be as described in WO-05/054712, comprising a planetary gear set with a sun gear (not separately shown) turned by the motor rotor, an annulus or ring gear 23*a*, 23*b* splined non-rotatably in the casing 17 and a planet carrier (not separately shown) between. A gear selector hub (not separately shown) is splined onto the respective through shaft 21*a*, 21*b* and can be shifted to engage through dogs with either the sun gear (thereby to transmit torque from the motor rotor 19*a*, 19*b* to the respective through shaft 21*a*, 21*b* in the same sense and at the same speed as the rotor) or with the planet carrier (thereby to transmit torque from the motor rotor 19*a*, 19*b* to the respective through shaft 21*a*, 21*b* in the same sense but at a reduced ratio (typically 4:1) compared to the speed of the rotor).

At its inboard end each through shaft 21*a*, 21*b* is splined as at 24*a*, 24*b* to a respective one of the annuli 10*a*, 10*b*, by which the transmission train at each side of the vehicle is coupled to the controlled differential 6. A practical embodiment of a controlled differential 6 as schematically illustrated in FIG. 2 and suitable for use in this configuration is fully described in our copending United Kingdom patent application no. 0502647.1. At its outboard end each through shaft 21*a*, 21*b* is splined to the sun gear 25*a*, 25*b* of a respective planetary gear set which provides a fixed gear reduction (of typically 3.5:1) in the transmission of torque from the through shafts to the remaining transmission components 3*a*, 3*b*, 4*a*, 4*b* and 5*a*, 5*b* of FIG. 1, this gear reduction stage also comprising an annulus or ring gear 26*a*, 26*b* splined non-rotatably in the casing 17 and a planet carrier 27*a*, 27*b* borne in the casing at 28*a*, 28*b*. The planet carriers 27*a*, 27*b* have splines 29*a*, 29*b* for the reception of shafts leading to the remaining transmission components.

In the arrangement illustrated in FIG. 3 it will be appreciated that the through shafts 21*a*, 21*b* provide a permanent connection between the controlled differential 6 and the transmission trains on each side of the vehicle irrespective of the torque-transmitting condition of the gear change mechanisms 22*a*, 22*b*. Steering control for the vehicle by operation of the steer motor 7 can therefore be maintained at all times even though torque transmission from the propulsion motors 1*a*, 1*b* to the through shafts 21*a*, 21*b* may be interrupted briefly as the gear change mechanisms 22*a*, 22*b* pass through a neutral condition when changing between high and low ratios. Changing gear while cornering is thereby facilitated. A further advantage of integrating the gear change and gear reduction mechanisms 2*a*, 2*b* in the same casing as the propulsion motors 1*a*, 1*b* as illustrated is that it facilitates cooling of the motor rotors and stators by oil distributed from the gear and bearing components and avoids the proliferation of rotary shaft seals to retain lubricant between different functional units.

The through shafts 21*a*, 21*b* are supported towards their inboard ends by respective bearings 30*a*, 30*b* held in webs 31*a*, 31*b* integral with the casing 17. These are preferably angular contact ball bearings to carry the axial loads generated by helical cut gear teeth of the respective reduction stage gears 25*a*/26*a*/27*a*, 25*b*/26*b*/27*b*, controlled differential annulus gears 10*a*, 10*b* and gear change mechanisms 22*a*, 22*b*—such being helically cut to reduce noise and vibration and to minimise impact loading on the gear teeth. At their outboard ends the through shafts 21*a*, 21*b* are supported by respective needle roller spigot bearings 32*a*, 32*b* to the reduction stage planet carriers 27a, 27b which are themselves supported by large diameter ball bearings 28a, 28b held in the casing 17. Note that despite being of larger diameter than the inboard bearings 30a, 30b, this is not a problem for the outboard bearings 28a, 28b as the planet carriers 27a, 27b rotate at only a fraction of the speed of the through shafts 21a, 21b.

A particular advantage of the illustrated bearing arrangement is that the motor rotors 19a, 19b are not supported by bearings to the casing 17 but by the bearings 20a, 20b between the respective rotor and through shaft 21a, 21b, which may be simple relatively low speed rated ball bearings. These bearings need not be of larger diameter than the through shaft support bearings 30a, 30b and can be of a lower speed rating because, depending on the ratio selected through the gear change mechanisms 22a, 22b, the through shafts 21a, 21b either rotate at the same speed as the respective motor rotor 19a, 19b (in which case the bearing elements in 20a, 20b do not rotate but simply revolve as a whole together with the respective rotor and through shaft) or at one quarter of the speed of the respective rotor (in which case the bearings 20a, 20b run at a maximum of three quarters of the speeds of the rotors). Problems associated with high speed large diameter bearings are therefore avoided in this arrangement.

The through shafts 21a, 21b in the illustrated arrangement support not only the respective motor rotors 19a, 19b but also (via the rotors) the respective gear change mechanisms 22a, 22b and, between them, the controlled differential 6, the latter by means of needle roller spigot bearings 33a, 33b to the cross shaft 12 (FIG. 2) of the controlled differential.

In summary, the whole of the transmission assembly illustrated in FIG. 3 (and excluding the steer motor 7 mounted externally on the casing 17) is supported by only four bearing points back to the casing, namely for the bearings 28a, 28b, 30a and 30b. This simplifies the design of the casing and its manufacturing tolerances and reduces the number of internal casing webs, thereby reducing the overall size of the assembly and the mass and cost of the casing. The provision of the spigot bearings 32a, 32b and 33a, 33b at the ends of the through shafts axially decouples those shafts from the casing allowing differential thermal expansion between the casing and shafts without generating undesirable loads on the bearings or casing.

The annuli 23a, 23b and 26a, 26b of the gear change mechanisms and gear reduction stages are preferably mounted in the casing 17 on involute splines with wide clearances. They are thus free to float radially in the casing within certain limits and to self-centre around the respective planetary gear sets when under load.

In a variant of the illustrated arrangement the bearings 28a, 28b between the planet carriers 27a, 27b and the casing 17 are omitted and the mesh between the respective planet gears (not separately shown) and annuli 26a, 26b is relied upon for bearing support of those planet carriers and through them the respective shafts 21a, 21b. The spigot bearings 32a, 32b between the through shafts 21a, 21b and the planet carriers 27a, 27b can also be replaced with spherical roller bearings for reacting moment loads. In this case the through shafts can still be axially decoupled from the casing to allow for differential thermal expansion, by virtue of the axial float of the respective planet gears in the respective annuli.

The invention claimed is:

1. A drive configuration for a skid steered vehicle comprising:
 a respective drive member at each side of the vehicle;
 a pair of electric drive transmissions each comprising a casing, an electric motor, and a through shaft for delivering torque from the motor;
 a controlled differential device located between said transmissions; and
 one or more steer motors coupled to the controlled differential device;
 the through shaft of each said transmission being coupled at one end to turn a respective said drive member; and
 said through shafts being coupled at their other ends to respective sides of the controlled differential device;
 wherein in each said transmission:
 the electric motor comprises a stator fixed in the casing and an associated rotor borne within the casing;
 the through shaft is separate from and passes coaxially through the rotor;
 a gear change mechanism is located within the casing and adapted to transmit torque from the rotor to the through shaft at selected gear ratios;
 the through shaft is rotationally supported at or towards each end thereof by a respective first bearing acting between said shaft and the casing; and
 the rotor is rotationally supported by second bearings acting between the rotor and the through shaft, said second bearings being located with respect to the through shaft intermediate said first bearings.

2. The drive configuration of claim 1 wherein the two said transmissions share a common casing which also houses components of the controlled differential device.

3. A vehicle equipped with the drive configuration of claim 1.

4. The drive configuration of claim 1 wherein each said transmission further comprises a gear reduction mechanism coupled between the through shaft and the respective said drive member.

5. The drive configuration of claim 4 wherein in each said transmission the through shaft is rotationally supported at said one end by a bearing acting between said shaft and a component of said gear reduction mechanism, said component being rotationally supported by a bearing acting between said component and the casing.

6. The drive configuration of claim 5 wherein in each said transmission said gear reduction mechanism comprises a planetary gear set and said component thereof is a planet carrier.

7. The drive configuration of claim 6 wherein in each said transmission the bearing acting between said planet carrier and the casing is constituted by the mesh of the associated planet gears with an annulus fixed in the casing.

8. The drive configuration of claim 1 wherein the controlled differential device comprises a pair of planetary gear sets each comprising a sun gear, planet gears carried by a planet carrier and an annulus; the steer motor(s) are coupled to impart relative rotation between the sun gears in opposite senses; the planet carriers are interconnected by a cross shaft such that the planet carriers rotate in common; and the through shafts of the electric drive transmissions are coupled at their said other ends to respective said annuli.

9. The drive configuration of claim 8 wherein the cross shaft of the controlled differential device is rotationally supported by bearings acting between such cross shaft and the through shafts of the electric drive transmissions.

10. An electric drive transmission comprising:
 a casing;
 an electric motor comprising a stator fixed in the casing and an associated rotor borne within the casing;
 a separate through shaft passing coaxially through the rotor for delivering torque from the motor to one or more loads;

a gear change mechanism located within the casing and adapted to transmit torque from the rotor to the through shaft at selected gear ratios; and a planetary gear reduction mechanism coupled to one end of the through shaft;

the through shaft being rotationally supported by bearings acting between said shaft and the casing; and the rotor being rotationally supported by bearings acting between the rotor and the through shaft;

wherein the through shaft is rotationally supported at said one end by a bearing acting between said shaft and a planet carrier of said gear reduction mechanism, said planet carrier being rotationally supported by a bearing constituted by the mesh of the associated planet gears with an annulus fixed in the casing.

11. A drive configuration for a skid steered vehicle comprising:

a respective drive member at each side of the vehicle;

a pair of electric drive transmissions each comprising a casing, an electric motor, and a through shaft for delivering torque from the motor;

a controlled differential device located between said transmissions; and one or more steer motors coupled to the controlled differential device;

the through shaft of each said transmission being coupled at one end to turn a respective said drive member; and said through shafts being coupled at their other ends to respective sides of the controlled differential device;

wherein in each said transmission:

the electric motor comprises a stator fixed in the casing and an associated rotor borne within the casing;

the through shaft is separate from and passes coaxially through the rotor;

a gear change mechanism is located within the casing and adapted to transmit torque from the rotor to the through shaft at selected gear ratios;

the through shaft is rotationally supported by bearings acting between said shaft and the casing; and the rotor is rotationally supported by bearings acting between the rotor and the through shaft;

and wherein the controlled differential device comprises a pair of planetary gear sets each comprising a sun gear, planet gears carried by a planet carrier and an annulus; the steer motor(s) are coupled to impart relative rotation between the sun gears in opposite senses; the planet carriers are interconnected by a cross shaft such that the planet carriers rotate in common; the through shafts of the electric drive transmissions are coupled at their said other ends to respective said annuli; and said cross shaft is rotationally supported by bearings acting between said cross shaft and said through shafts.

* * * * *